United States Patent Office 3,573,103
Patented Mar. 30, 1971

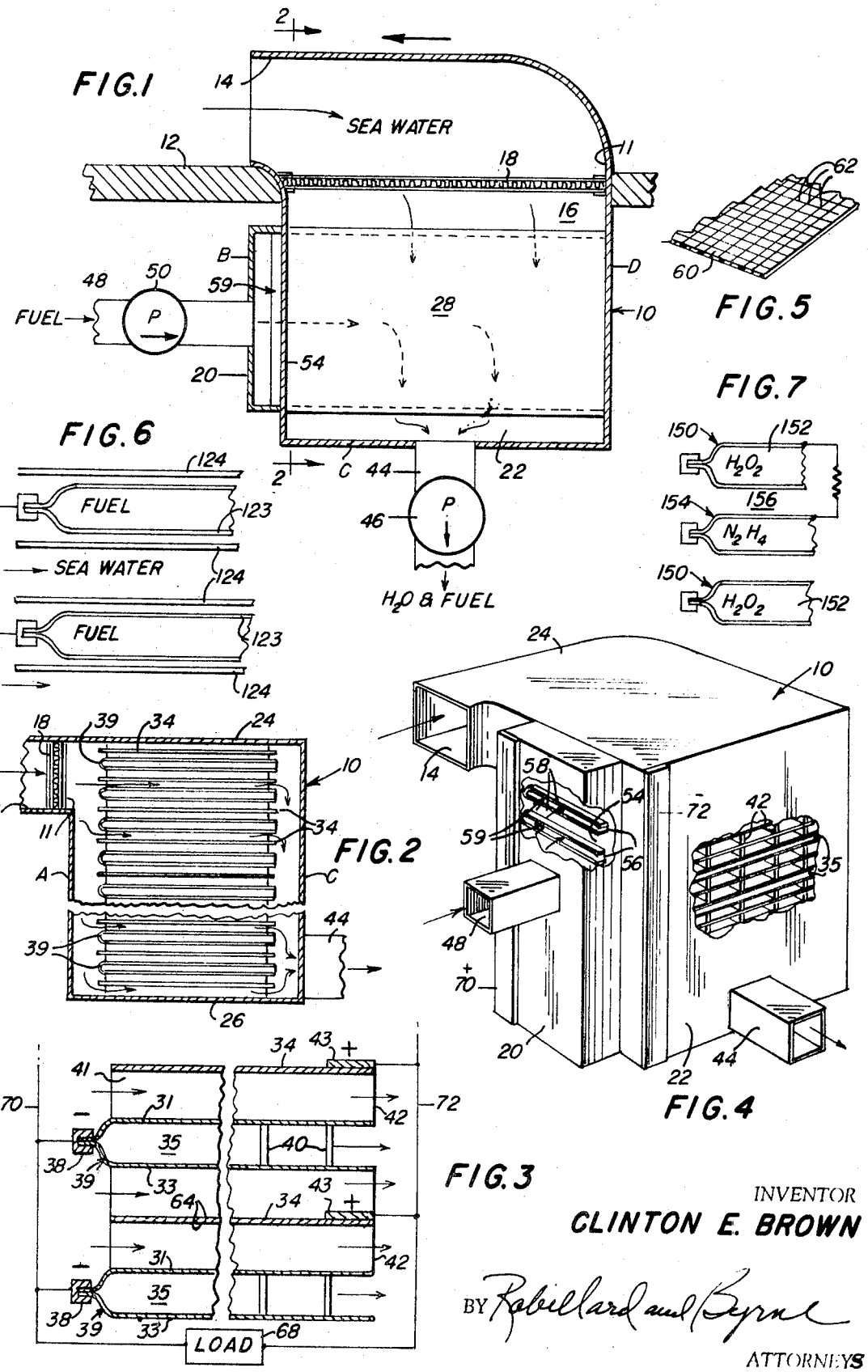

3,573,103
GILL OR SEA WATER FUEL CELL
Clinton E. Brown, Silver Spring, Md., assignor to Hydronautics, Incorporated, Laurel, Md.
Filed Oct. 23, 1965, Ser. No. 503,021
Int. Cl. H01m 27/00
U.S. Cl. 136—86   5 Claims

ABSTRACT OF THE DISCLOSURE

A fuel cell utilizing sea water as the cell's supply of oxidant reactant and as the electrolyte for the cell.

---

This invention relates generally to a fuel cell for the generation of an electrical current and, more specifically, relates to a fuel cell wherein sea water is used as the cell's oxygen supply and as the electrolyte for the system. Also, and more specifically, the fuel cell of this invention is uniquely adapted for use in undersea vessels and similar environments where a ready supply of sea water, but not free gaseous oxygen, is available.

The prior art is aware of fuel cell systems in which the supply of gaseous oxygen is furnished by air or hydrogen peroxide, nitrogen tetroxide and other similar oxidants. Since an oxidant supply of this type is part of the system, it must be considered as part of the unit volume and weight and, if the battery is to operate for long periods of time, this volume and weight can be considerable when compared with overall cell weight. A principal objective of this invention is, therefore, to provide a system which uses the free dissolved oxygen in sea water as the oxygen supply whereby only the fuel must be furnished by the battery system.

A further objective of the invention is to provide a fuel cell type battery which efficiently rids the system of reaction products and heat by the use of sea water. The removal of such reaction products and heat has placed important limitations on similar batteries now known to the art.

Broadly stated, an important objective of this invention is to provide a fuel cell for submerged vessels in which the volume and weight, normally associated with such systems, is avoided. The invention accomplishes this goal through the use of a high energy fuel which is oxidized by the dissolved oxygen in sea water thereby removing the necessity of transporting and storing oxygen or an oxygen carrier that occupies large important storage space and increases system weight.

These and other objectives of this invention will be more fully understood when viewed in light of the attached drawings in which:

FIG. 1 is a diagrammatic view of the system;
FIG. 2 is a sectional view on line 2—2 of FIG 1;
FIG. 3 is an enlarged fragmentary diagrammatic view of a typical component arrangement;
FIG. 4 is a perspective of the fuel cell unit with parts broken away;
FIG. 5 is a greatly enlarged diagrammatic view of one electrode;
FIG. 6 is a further embodiment showing one fuel cell component with a variation in electrode placement; and
FIG. 7 is a further embodiment utilizing one concept of the invention with more conventional systems.

In general the apparatus of this invention is a battery pack for electrical current generation consisting of a multilayered system of spaced electrodes in a common housing. The electrodes alternately form fuel feeding chambers and sea water chambers. The electrodes are constructed for causing current producing reactions. In operation, sea water, and fuel are independently brought through a layered system where (1) oxygen is removed, (2) a current producing reaction takes place and, (3) the products of reaction are exhausted. The sea water, in addition to acting as the source of oxygen, serves as the electrolyte and the vehicle by which the products of reaction are removed. The system is composed of a selected number of individual cells connected in series within a basic module or series of modules.

Referring now more particularly to the drawings wherein like numerals indicate like elements, the numeral 10 indicates a housing for a battery or cell system. The housing is mounted within an opening 11 formed in the hull 12 of a submerged vessel. A sea water intake opening and conduit 14 communicates the opening to a manifold 16. A filter 18 is disposed across conduit 14 for eliminating foreign materials from the manifold area. The housing 10 is comprised of four sides A, B, C, and D. The side A is formed with the sea water manifold 16, the side B is formed with a fuel intake manifold 20 and the side C is formed with an exhaust manifold 22. Side D is closed. The sides are enclosed by a top 24 and a bottom 26.

A stack of cell units 28 are supported within the housing 10. The cell units are comprised of anodes and cathodes. Adjacent anodes 31 and 33 are joined along a common edge by a terminal strip 38 forming an anode envelope 39 having an interior space or chamber 35. The anodes 31 and 33 are spaced from one another by a plurality of non-reactive spacer strips 40, preferably made of Teflon. The closed ends, or terminal strip ends of the anode envelopes 39, extend into the sea water manifold 16. A plurality of cathodes 34 are disposed between each of the envelopes 39 and are maintained in spaced relationship therewith by a plurality of non-reactive spacers 42. The chambers thus defined are indicated by the numeral 41. Each cathode is equipped with a terminal strip 43 at their ends opposite terminal strips 38.

The system further includes an exhaust line 44 leading from the exhaust manifold 22. A pump 46 is disposed across line 44 for withdrawing sea water and spent reaction products from the system. A fuel intake line 48 for delivering the high energy fuel to the manifold is equipped with a pump 50. From the manifold 20, the fuel travels into chambers 35, defined by the anodes 31 and 33 of the anode envelopes 39, through side openings 59. The manifold 20 includes a baffle plate 54 having elongated rectangular openings 56 formed therein to receive side extensions 58 of anodes 31 and 33 that define the openings 59. The interiors of the anode envelopes (chambers 35) are thus communicated with the fuel manifold while the baffle plate isolates these interiors from the sea water in manifold 16 and chambers 41.

The mechanical movements of the seat water and the fuel can be understood by referring to the arrows in FIG. 1. The sea water electrolyte enters manifold 16, transverses the cell unit stack through chambers 41 and exhausts through manifold 22 and line 44. The fuel enters the stack transverse to the sea water flow through chambers 35. As a result of reaction processes outlined more fully below, the fuel diffuses across the anode sheets and is exhausted as a reaction product through through manifold 22 and line 44.

The anodes 31 and 33 are of a micro porous substance, for instance, cellophane, which upon their exterior surface have a vacuum-deposited film or coating 60 of black platinum (Pt. 32) or palladium. The coating acts as a catalyst in a manner described hereinafter. Over the platinum or palladium film there is an electro-formed grid 62 of titanium which serves as a current conductor. The cathode 34 is in the form of a grid made of a conducting material such as titanium which is plated with a coating of platinum black 64.

In operation, the sea water, which in addition to other substances includes water, sodium chloride and dissolved free oxygen, is pulled through channels 41 by action of pump 46. The fuel, for example hydrazine ($N_2H_4$), is forced into channels 35 by action of pump 50. As the fuel penetrates anodes 31 and 33, it contacts the catalytic surface. As a result, an electro-chemical reaction, well-known to those skilled in the chemical arts, takes place in which the hydrazine fuel is decomposed into free nitrogen and hydrogen. The hydrogen is, in turn, converted to hydrogen ions and yields electrons according to the following reaction equation:

$$N_2H_4 \rightarrow N_2 + 4H^+ + 4 \text{ electrons} + \text{heat}$$

The nitrogen $N_2$ diffuses into channels 41 and is carried away with the exhausted or spent sea water. The hydrogen ions diffuse through the sea water electrolyte to the opposing cathode. At the cathode, by virtue of the catalytic action of its surface, oxygen is caused to electro-chemically react with water according to the following equation:

$$O_2 + 2H_2O \rightarrow 4(OH)^- - 4 \text{ electrons}$$

Thus 4 hydroxyl ions $OH^-$ are produced and the 4 electrons from the external circuit are absorbed. The external load is diagrammatically represented by the numeral 68. The 4 electrons represent those electrons transferred through the external circuit from the anode and constitute the Faraday current for the cell. As seen in FIG. 3, the currents in terminal strip 38 are connected to a load via the collector or bus bar 70 and the currents in terminal strips 43 are connected to the load via the collector or bus bar 72. The gross reaction occurring in the cell may, therefore, be represented by the chemical equation:

$$N_2H_4 + O_2 \rightarrow N_2 + 2H_2O$$

The reaction products, $N_2$ and water plus the waste heat generated, are efficiently carried from the system by the flow of spent sea water which is exhausted from the system via pump 46.

Although not leading to the final development of electrical energy, the free dissolved oxygen $O_2$ in chamber 41 is also available for reaction with the hydrazine fuel at the anodes 31 and 33. The reaction between the hydrazine and the oxygen at the anodes, merely produces additional free nitrogen and water which is carried away by the seat water flow. It does, however, constitute a loss of hydrazine (without a corresponding current generation) which can be avoided by use of the embodiment depicted in FIG. 6. Note in FIG. 6 that the cathodes 124 are located immediately adjacent the anode envelopes 123. The anodes 123 and the cathodes 124 are maintained in a close, spaced relationship by way of plastic grids (not shown). The flow of sea water through the stack is between adjacent cathodes 124 such that the anodes envelopes are now shielded from the free oxygen by the presence of the cathodes. Thus the supply of free oxygen which comes in contact with the anodes is lessened. It should be understood that in the embodiment of FIG. 6, the cathodes 124 must be a porous network or grid to permit the nitrogen formed at the anodes to diffuse into the sea water stream in channel between cathodes 124. The outside circuitry and all other physical arrangements can remain the same when utilizing the FIG. 6 embodiment.

One of the principal advantages of this invention, namely, the continuous removal of the reaction products, can be attained with more conventional fuel cells. As stated previously, standard fuel cell systems include a supply of oxidant which is carried to a position of reaction with the fuel. In the system of FIG. 7, the cathode 150 is formed in envelope fashion and defines an oxidant chamber 152 for accepting an oxidant such as hydrogen peroxide $H_2O_2$.

The anodes 154 are the same as those previously described and carry a supply of fuel such as $N_2H_4$. In make-up, cathodes 150 differ from those previously described by rendering the platinum black coated titanium element unnecessary. Rather the cathode sheets are made of a microporous material having a platinum black film covered with a titanium collecting grid similar in construction to the anodes previously described. Alternating, spaced stacks of the electrodes are supported within the housing in the manner previously described.

The reaction at the anodes is the same as that previously described. At the cathodes, the oxidant penetrates the the catalytic surface to produce water and free oxygen $O_2$. The oxygen, in turn, reacts as described previously to produce hydroxyl ions and to absorb electrons, according to the reaction equation:

$$O_2 + 2H_2O \rightarrow 4(OH)^- - 4 \text{ electrons}$$

The overall reaction of the fuel cell is given by the equation:

$$N_2H_4 + 2H_2O_2 \rightarrow N_2 + 4H_2O$$

Inasmuch as the sea water in chamber 156, between electrodes, is being constantly replaced, the products of reaction are carried to sea as fast as they form.

In each of the described embodiments, the voltage produced by the cell is greatly dependent on the reversability of the electrode reactions and for the present invention it is anticipated that cell voltages in the vicinity of one volt should be attained. This is particularly true for embodiments of FIG. 1–6 where the current densities are very low.

In a general manner, while there has been disclosed several effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:
1. A fuel cell assembly comprising:
 a housing having a fuel reactant intake manifold, a sea water intake manifold for supply oxygen containing sea water to the housing, and an exhaust manifold;
 a fuel electrode in the form of a hollow envelope mounted within the housing and permeable to fuel reactant, the interior of the envelope being open only to the housing's fuel reactant intake manifold to isolate the interior of the fuel electrode from the sea water intake manifold;
 an oxidant electrode mounted with the housing and spaced from the outer surface of the fuel electrode to form a sea water electrolyte channel therewith, said channel having an inlet end connected to the housing's sea water intake manifold and a outlet end connected to the housing's exhaust manifold to permit the continuous and uninterrupted flow of oxygen containing sea water through said channel from the inlet to the outlet as the oxidant reactant and as the electrolyte for the cell;
 and means for connecting an external electrical circuit between the fuel and oxidant electrodes;
 said fuel electrode containing a catalyst promoting an electro-chemical reaction in which the fuel reactant is converted to hydrogen ions and gives up electrons to the circuit and the oxidant electrode containing a catlyst promoting a reaction between the oxygen in the sea water and the sea water to form hydroxyl ions and absorb electrons from the circuit.

2. The fuel cell of claim 1, in which the fuel electrode envelope has spaced planar sides permeable to the fuel reactant and a planar oxidant electrode is spaced from each side of the fuel electrode to form a sea water electroylte channel on either side of the fuel electrode for the flow of sea water through the cell.

3. The fuel cell of claim 2, including a plurality of fuel electrode envelopes having spaced planar sides stacked in spaced relationship within the housing the interior of each envelope being open only to the housing's fuel reactant intake manifold to isolate the interior of the fuel electrodes from the sea water intake manifold and a plurality of planar oxidant electrodes, each of said oxidant electrodes being mounted between opposed sides of a pair of adjacent fuel electrode envelopes to form a pair of sea water electrolyte channels therewith for the flow of sea water through the cell.

4. The fuel cell of claim 1, wherein the sea water intake manifold is located on the opposite side of the housing from the exhaust manifold.

5. A fuel cell assembly comprising:
  a housing having a fuel reactant intake manifold, a sea water intake manifold for supplying oxygen containing sea water to the housing, and an exhaust manifold;
  a plurality of fuel electrodes in the form of a hollow envelope stacked in spaced relationship within the housing, each of said envelopes having spaced planar sides permeable to the fuel rectant, and the interior of each envelope being open only to the housing's fuel reactant intake manifold to isolate the interior of the fuel electrodes from the sea water intake manifold;
  a plurality of porous planar oxidant electrodes mounted within the housing, each oxidant electrode being located closely adjacent a side of a fuel electrode, whereby each opposed pair of oxidant electrodes forms a sea water electrolyte channel, each of said channels having an inlet end connected to the housing's sea water intake manifold and an outlet end connected to the housing's exhaust manifold to permit the continuous and uninterrupted flow of oxygen containing sea water through said channels as the oxidant reactant and as the electrolyte for the cell;
  means for connecting an external electrical circuit between the fuel and oxidant electrode;
  said fuel electrodes containing a catalyst promoting an electro-chemical reaction in which the fuel reactant is converted to hydrogen ions and gives up electrons to the circuit and said oxidant electrodes containing a catalyst promoting a reaction between the oxygen in the sea water and the sea water, forming hydroxyl ions and absorbing electrons from the circuit.

References Cited
UNITED STATES PATENTS

| | | | |
|---|---|---|---|
| 2,925,454 | 2/1960 | Justi et al. | 136—86 |
| 3,227,585 | 1/1966 | Langford et al. | 136—86E |
| 3,321,335 | 5/1967 | Wilson | 136—100 |
| 2,615,931 | 10/1952 | Hatfield | 136—86A |

FOREIGN PATENTS

| | | | |
|---|---|---|---|
| 350,100 | 8/1905 | France | 136—86 |

WINSTON A. DOUGLAS, Primary Examiner

H. A. FEELEY, Assistant Examiner